(12) United States Patent
Kulkarni (10) Patent No.: US 12,123,514 B2
(45) Date of Patent: Oct. 22, 2024

(54) SOLENOID VALVE

(71) Applicant: HUSCO Automotive Holdings LLC, Waukesha, WI (US)

(72) Inventor: Abhijit Kulkarni, Maharashtra (IN)

(73) Assignee: HUSCO Automotive Holdings LLC, Waukesha, WI (US)

( * ) Notice: Subject to any disclaimer, the term of this patent is extended or adjusted under 35 U.S.C. 154(b) by 0 days.

(21) Appl. No.: 17/751,317

(22) Filed: May 23, 2022

(65) Prior Publication Data

US 2023/0375102 A1    Nov. 23, 2023

(51) Int. Cl.
*F16K 31/06* (2006.01)
*F16K 27/02* (2006.01)

(52) U.S. Cl.
CPC ........ *F16K 31/0631* (2013.01); *F16K 27/029* (2013.01)

(58) Field of Classification Search
CPC ............................ F16K 31/0631; F16K 27/029
See application file for complete search history.

(56) References Cited

U.S. PATENT DOCUMENTS

| | | | | |
|---|---|---|---|---|
| 6,328,065 B1* | 12/2001 | Schmid | .............. | G05D 16/2024 137/596.17 |
| 6,904,934 B2* | 6/2005 | Runge | ................ | G05D 16/2024 137/596.17 |
| 7,516,756 B2* | 4/2009 | Mayr | ...................... | F16D 48/02 137/596.17 |
| 8,746,279 B2* | 6/2014 | Muzquiz | ............. | F16K 31/0637 137/596.17 |
| 2008/0087854 A1 | 4/2008 | Voss | | |

OTHER PUBLICATIONS

European Patent Office, Extended Search Report, Application No. 23173216.5, Sep. 21, 2023, 9 pages.

* cited by examiner

*Primary Examiner* — Eric Keasel
(74) *Attorney, Agent, or Firm* — Quarles & Brady LLP (57) ABSTRACT

A solenoid valve is provided. The solenoid valve can include a valve body, a solenoid actuator, a valve insert, and first and second movable valve elements. The valve body can include a valve bore, a control port, a first port, and a second port, in which the control port is arranged in a nose of the valve body. The solenoid actuator is coupled to the valve body and configured to selectively move a pin between a first position and a second position to move first and second valve elements. Movement of the pin, by the solenoid actuator, between the first position and the second position selectively connects the control port to the first port or the second port.

19 Claims, 7 Drawing Sheets

SOLENOID VALVE

CROSS-REFERENCE TO RELATED APPLICATIONS

Not Applicable.

STATEMENT REGARDING FEDERALLY SPONSORED RESEARCH

Not Applicable.

BACKGROUND

Solenoids typically include a wire coil that may be selectively energized (i.e., supplied with current having a particular magnitude and direction) to move an armature between one or more positions.

BRIEF SUMMARY

According to one aspect of the present disclosure, a solenoid valve is provided. The solenoid valve includes a valve body, a solenoid actuator, a valve insert, and first and second valve elements. The valve body includes a valve bore, a control port, a first port, and a second port. The control port is arranged in a nose of the valve body. The solenoid actuator is coupled to the valve body and configured to selectively move a pin between a first position and a second position. The pin extends from the solenoid actuator into the valve bore. The valve insert is arranged within the valve bore and includes a first valve seat and a second valve seat. The first valve element coupled to the pin and movable with the pin to selectively engage the first valve seat, and the second valve element movable by the pin to selectively engage the second valve seat. Movement of the pin, by the solenoid actuator, between the first position and the second position selectively connects the control port to the first port or the second port.

In another aspect, a solenoid valve movable between a first configuration and a second configuration is provided. The solenoid valve includes a valve body including a valve bore, a control port, a first port, and a second port, in which the control port is arranged in a nose of the valve body. The solenoid valve further includes a solenoid actuator coupled to the valve body and configured to selectively actuate a pin extending from the solenoid actuator and into the valve bore, a valve insert arranged within the valve bore and including a poppet seat arranged between the control port and the first port and a ball seat arranged between the control port and the second port, a poppet coupled to the pin and movable, by the solenoid actuator, between an open position and a closed position, and a valve ball slidably received within a ball chamber included in the valve body. When the solenoid valve is in the first configuration, the poppet is in the open position to provide fluid communication between the first port and the control port, and the valve ball is configured to engage the ball seat in response to a pressure in the second port. When the solenoid valve is in the second configuration, the poppet is in the closed position and in engagement with the poppet seat, and a distal end of the pin engages the valve ball to provide fluid communication between the second port and the control port.

In another aspect, a solenoid valve is provided. The solenoid valve includes a valve body including a valve bore, a control port, a first port, and a second port, in which the control port is arranged in a nose at a distal end of the valve body. The solenoid valve also includes a solenoid actuator coupled to the valve body and configured to selectively move a pin between a first position and a second position, in which the pin extends from the solenoid actuator into the valve bore. The solenoid valve further includes a valve insert arranged within the valve bore and including an annular wall that defines an axial channel extending between a first valve seat and a second valve seat, a first valve element coupled to the pin and movable with the pin to selectively open and close the first valve element relative to the first valve seat to, respectively, provide or inhibit fluid communication between the first port and the axial channel, and a second valve element movable by the pin to selectively open and close the second valve element relative to the second valve seat to, respectively, provide or inhibit fluid communication between the second port and the axial channel. The valve body further includes an annular chamber in fluid communication with the axial channel and the control port such that movement of the pin, by the solenoid actuator, between the first position and the second position selectively provides fluid communication between the control port and the first port or the control port and the second port, respectively.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled," and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

The use herein of the term "axial" and variations thereof refers to a direction that extends generally along an axis of symmetry, a central axis, or an elongate direction of a particular component or system. For example, an axially-extending structure of a component may extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

The use herein of the term "separated" refers to features that are spaced apart from each other. For example, axially separated features of a component may be features that are spaced apart from each other along an axial direction. Unless otherwise specified or limited, use of the term "separated," is not intended to require any other particular alignment of features with respect to a referenced direction. For example, axially separated components may generally be spaced apart from each other relative to an axial direction, while being or not being disposed or otherwise aligned along a common axially extending reference line. Similarly, for example, radially separated components may generally be spaced apart from each other relative to a radial direction, while being separated from each other, or not separated from each other, relative to an axial direction. Similarly, for example, circumferentially separated components may generally be spaced apart from each other relative to a circumferential direction, while being separated from each other, or not separated from each other, relative to a radial direction or an axial direction.

Solenoid valves can include control ports that can be selectively connected, by the solenoid valve, to a pressure source or a tank. The control port, which may also be referred to herein as a control port or A-port, is generally a port configured for adjusting or controlling a flow rate through a device or a fluid pressure supplied to a device. For example, the control port may be connected to a device, such as a pump, to control an amount of fluid transported by the device. In some examples, the control port is arranged at a point along the length of a valve body of the solenoid valve. However, placing the control port along the length of the valve body can lead to more complex application structures (e.g., manifold designs). Additionally, having the control port along the length of the valve body can lead to a larger valve body (e.g., longer axial length), increasing the overall size of the solenoid valve. In addition, a larger valve body can lead to a larger required actuation range for a solenoid actuator of the solenoid valve, which can also increase the overall size of the solenoid valve. Generally, the present disclosure provides systems and methods for a valve that is solenoid operated and includes a control port disposed in a nose of a valve body (e.g., a distal end of the valve body). Providing the control port in the nose of the valve body can reduce the axial length of the valve, while also reducing the overall actuation range required by a solenoid actuator. In addition, the inclusion of the control port in the nose of the valve body can provide more efficient flow paths within the application structure (e.g., manifold).

In general, the solenoid may include an armature that is selectively movable between one or more positions, which may control the valve. For example, the armature may be movable from a first position to a second position, and vice versa. The armature may be held or maintained in the first position by physical engagement with a biasing mechanism (e.g., a spring, a linkage, another mechanical device capable of providing a biasing force on a surface, or fluid pressure), and the armature may be actuated toward the second position by activation of the solenoid, i.e., by generating a magnetic field to move the armature.

Figure 1:
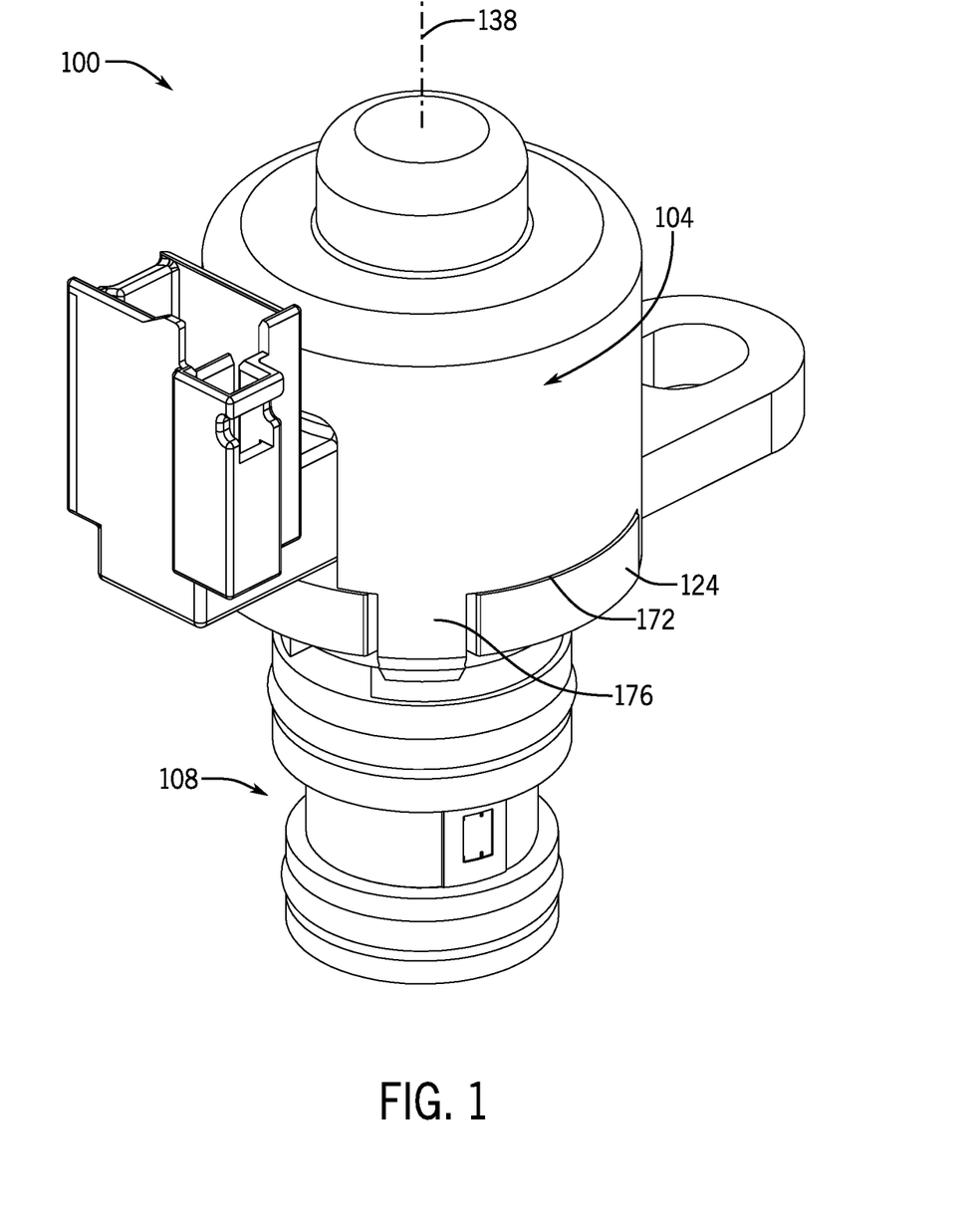
FIG. 1 is an isometric view of a solenoid valve according to one aspect of the present disclosure.
Figure 2:
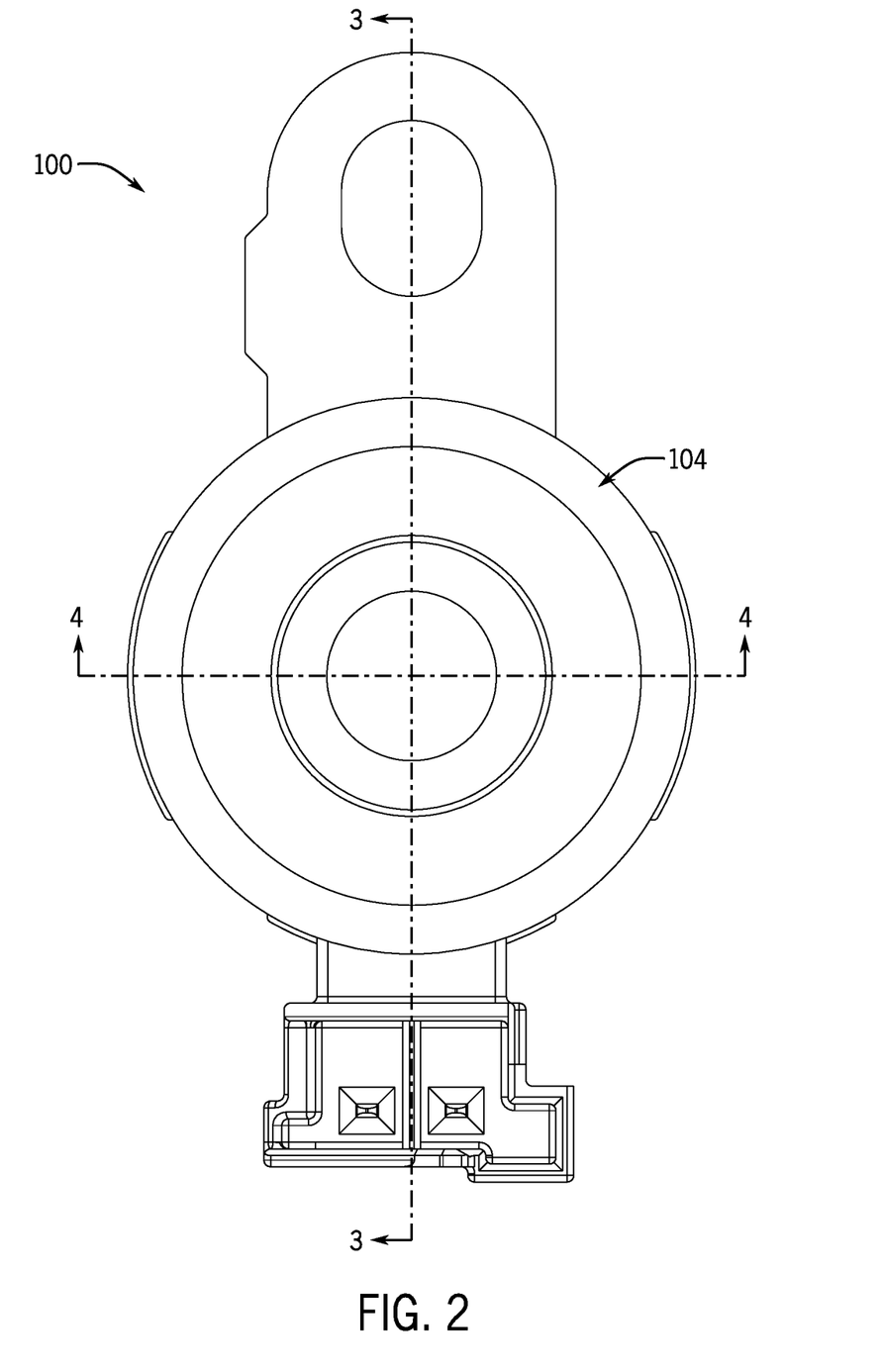
FIG. 2 is a top plan view of the solenoid valve of FIG. 1.
Figure 3:
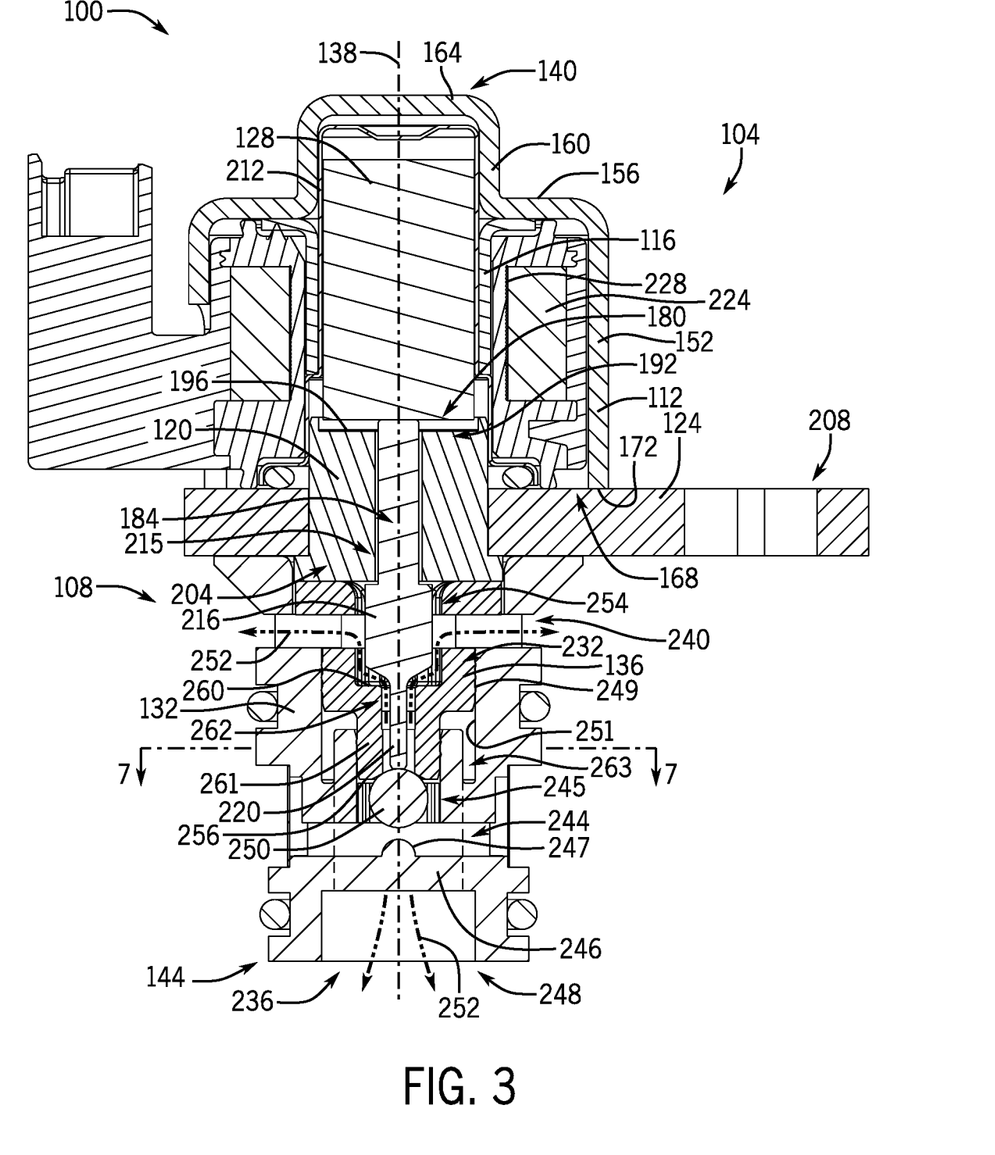
FIG. 3 is a cross-sectional view of the solenoid valve of FIG. 2 taken along line 3-3 with the solenoid valve being in a first configuration.
Figure 4:
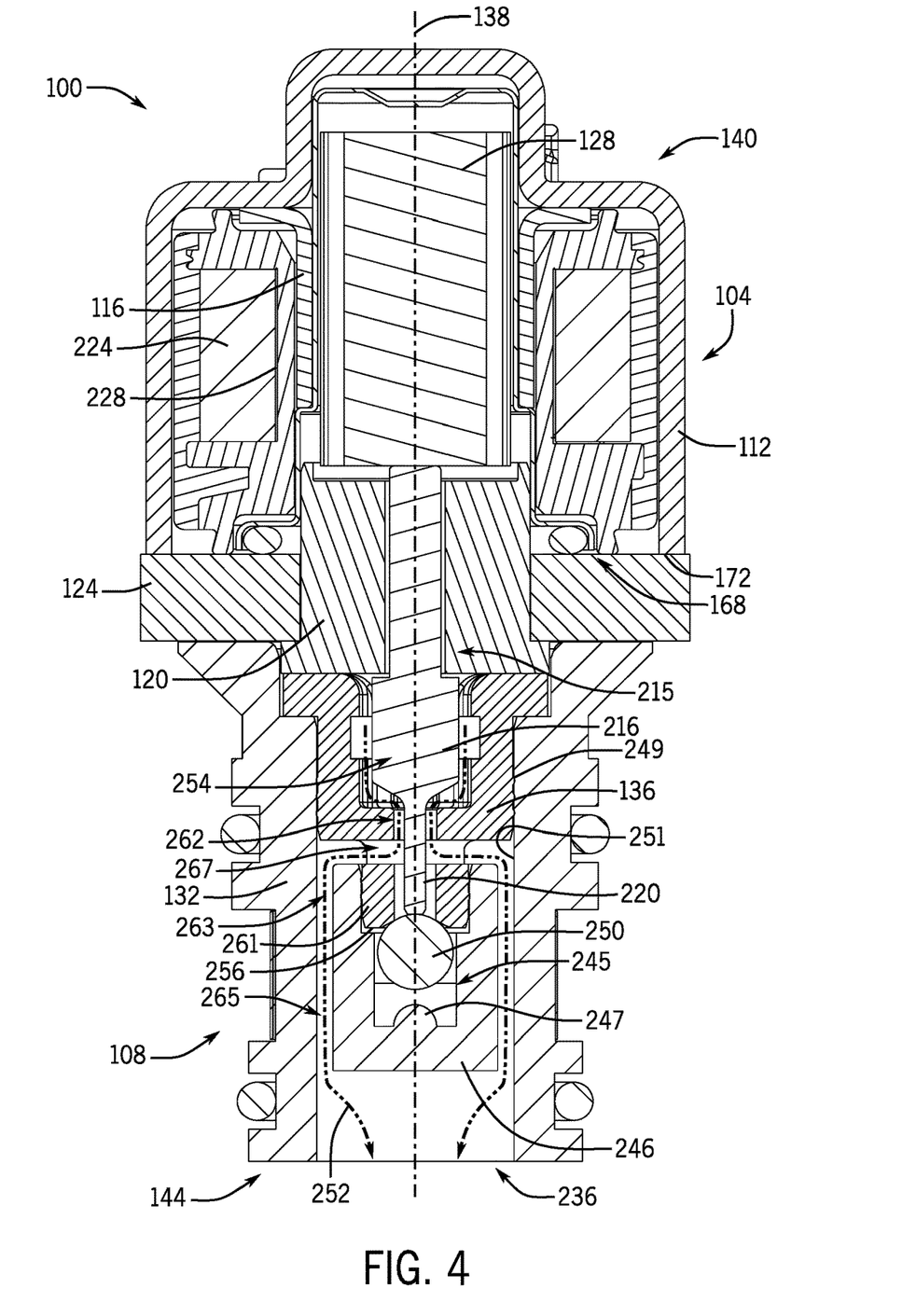
FIG. 4 is a cross-sectional view of the solenoid valve of FIG. 2 taken along line 4-4 with the solenoid valve being in the first configuration.

FIGS. 1 and 2 illustrate one non-limiting example of a solenoid control valve 100 according to the present disclosure. The solenoid control valve 100 may include a solenoid actuator 104 coupled to a valve portion 108. Referring to FIGS. 3 and 4, the solenoid actuator 104 may include a solenoid housing 112, a first pole piece 116, a second pole piece 120, an end plate 124, and an armature 128. The valve portion 108 includes a valve body 132 and a valve insert 136. In general, the components of the solenoid actuator 104 and the valve portion 108 may be concentrically arranged or aligned along a central axis 138 (e.g., a longitudinal axis), defining a first end 140 and an axially opposing second end 144 of the solenoid control valve 100.

In the illustrated non-limiting example, the solenoid housing 112 may define a generally cylindrical shape, and can be fabricated from a magnetically-conductive material (e.g., magnetic steel, iron, nickel, etc.). In other non-limiting examples, the solenoid housing 112 may define another shape, as desired. The solenoid housing 112 may be formed as a unitary component (i.e., as a single piece of material) and may include a first outer wall portion 152, a first top wall portion 156, a second outer wall portion 160, and a second top wall portion 164. The first outer wall portion 152 axially extends from the end plate 124 to a junction between the first outer wall portion 152 and the first top wall portion 156. Further, the first outer wall portion 152 is disposed radially outwardly from the second outer wall portion 160, and the first top wall portion 156 radially extends from the first outer wall portion 152 to the second outer wall portion 160. Accordingly, the second outer wall portion 160 axially extends from the first top wall portion 156 in an axial direction opposite the first outer wall portion 152. Further, the second outer wall portion 160 extends to the second top wall portion 164, which is disposed at the first end 140 of the solenoid control valve 100. At an open end 168 of the solenoid actuator 104 opposite the first end 140, the solenoid housing 112 may be attached or coupled to the end plate 124 at a free edge 172 of the first outer wall portion 152. For example, a plurality of latches 176 (see FIG. 1) may axially extend from the free edge 172 and be configured to secure to the end plate 124.

The first pole piece 116 is disposed within the solenoid housing 112. The first pole piece 116 may be fabricated from a magnetically-conductive material (e.g., magnetic steel, iron, nickel, etc.) and may be coupled to the solenoid housing 112 such that it axially extends from proximate the first top wall portion 156 of the solenoid housing 112 toward the end plate 124. In some non-limiting examples, the portions of the solenoid housing 112 may be formed by one or more individual components. For example, in some non-limiting examples, the first outer wall portion 152 may be formed separately from the second outer wall portion 160 and subsequently coupled. In some non-limiting examples, for example, the end plate 124 may be formed with (e.g., as a unitary component) the solenoid housing 112, and the second top wall portion 164 may be coupled to the second outer wall portion 160 as an additional end cap.

The second pole piece 120 may be arranged at least partially within the solenoid housing 112. The second pole piece 120 may be fabricated from a magnetically-conductive material (e.g., magnetic steel, iron, nickel, etc.). In the illustrated non-limiting example, the second pole piece 120 may be axially separated from the first pole piece 116 and may extend axially across the end plate 124. The second pole piece 120 may include an armature recess 180 and central bore 184. In the illustrated non-limiting example, the armature recess 180 axially extends from a first end 192 of the second pole piece 120. The armature recess 180 is generally dimensioned to receive the armature 128, when the armature 128 is in a first position or a second position, and may define an armature surface 196 that is sized and shaped according to a size and shape of the armature 128. In some non-limiting examples, the solenoid actuator 104 may not include first and second pole pieces 116, 120. For example, the housing 112 of the solenoid actuator 104 can be configured to function as a pole piece without the need for separate pole pieces.

As discussed above, the end plate 124 may be attached or coupled to the open end 168 of the solenoid housing 112. For example, the open end 168 of the solenoid housing 112 may be adhesively attached, crimped, welded, or press-fit to the end plate 124. In any case, the end plate 124 may enclose the generally open end 168 of the solenoid housing 112. The end plate 124 may be fabricated from a magnetically-conductive material (e.g., magnetic steel, iron, nickel, etc.). In the illustrated non-limiting example, the end plate 124 may generally define a plate that includes a first opening 204 configured to receiving and retain the second pole piece 120. Further, the end plate 124 may include a second opening 208 that may be used to secure the solenoid actuator 104 to a structure or mechanism. For example, the second opening 208 may receive a fastener for mounting the solenoid control valve 100 to a structure (e.g., a manifold, valve block, etc.).

In general, the armature 128 may be at least partially arranged within the solenoid housing 112 and may be movable from a first position to a second position, and vice versa, by excitation of the solenoid actuator 104. The armature 128 may be fabricated from a magnetically-conductive material (e.g., magnetic steel, iron, nickel, etc.). In the illustrated non-limiting examples, the solenoid actuator 104 may include an armature tube 212 within which the armature 128 may be movably received. The armature tube 212 may be a thin-walled tube that is fabricated from a non-magnetically-conductive material (e.g., non-magnetically-conductive stainless steels).

The solenoid actuator 104 may further include a wire coil 224 arranged within the solenoid housing 112. The wire coil 224 may be wrapped around a bobbin 228. The bobbin 228 may be fabricated from a non-magnetically-conductive material (e.g., plastic) and may be arranged within the solenoid housing 112 so that the wire coil 224 wraps around at least a portion of the armature 128. The wire coil 224 may be fabricated, for example, from a copper coil that is configured to produce a magnetic field, and thereby apply a force to the armature 128, in response to the wire coil 224 being energized (i.e., a current applied to the wire coil 224). The magnitude and direction or polarity of the magnetic field, and the force applied to the armature 128, may be governed by the magnitude and direction of the current applied to the wire coil 224. In some non-limiting examples, the wire coil 224 may be in electrical communication with a controller (not show) via electrical contacts on the solenoid actuator 104. The controller may be configured to selectively apply a current to the wire coil 224 with a particular magnitude and direction. Generally, the solenoid actuator 104 is configured to selectively move the armature 128 between a first position and a second position, and vice versa.

In the illustrated example, the solenoid valve 100 includes a push pin 215 extending from the armature 128, and from the solenoid actuator 104 in general, into a valve bore 232 of the valve body 132. The push pin 215 can define the central axis 138. The push pin 215 can be coupled to, or engaged by, the armature 128 for actuation with the armature 128. That is, the solenoid actuator 104 can selectively actuate the push pin 215 between a first or retracted position (see FIGS. 3 and 4) and a second or extended position (see FIGS. 5 and 6), and vice versa. In some non-limiting examples, the push pin 215 and the armature 128 may be formed as a unitary component (e.g., from a single pieces of material). As will be described herein, the solenoid control valve 100 can include a first valve element 216 and a second valve element 250 that are selectively movable by the push pin 215 such that movement of the push pin 215, by the solenoid actuator 104 between the first and second positions can selectively connect at least two ports in the valve body 132.

The push pin 215 can include a first valve element 216 coupled thereto such that the first valve element 216 is movable with the push pin 215. In the illustrated non-limiting example, the first valve element 216 is configured as a poppet 216. A pin extension 220 can axially extend from the poppet 216 to a distal end of the push pin 215 in a direction towards the second end 144 of the solenoid control valve 100. In some non-limiting examples, the poppet 216 and the push pin 215 can be formed as a unitary component. The push pin 215 may extend axially through at least a portion of the second pole piece 120 and the end plate 124. In the illustrated non-limiting example, the push pin 215 may slidably extend through the central bore 184 of the second pole piece 120. The push pin 215 may be formed as a unitary component (i.e., a single piece of material), with the pin extension 220 extending axially from an end of the poppet 216. The poppet 216 may extend radially outward from the push pin 215. In the illustrated example, a diameter defined by the poppet 216 may be greater than a diameter defined by the pin extension 220. As will be described below, actuation of the push pin 215, and thereby actuation of the poppet 216 and the pin extension 220, may be configured to control flow through one or more ports in the valve body 132.

With continued reference to FIGS. 3 and 4, the valve portion 108 includes the valve body 132 that defines the valve bore 232 and a plurality of ports. More specifically, in the illustrated non-limiting example, the valve body 132 defines a control port 236, a first port 240, and a second port 244. The control port 236, which may also be referred to as an A-port, is arranged at a nose 248 of the valve body 132, the nose 248 being at the second end 144 of the solenoid control valve 100. Accordingly, the control port 236 may be centrally disposed and/or axially aligned with the central axis 138 and arranged at a distal end (e.g., the second end 144) of the valve body 132. The arrangement of the control port 236 at the nose 248 of the valve body 132 provides efficient operation and flow paths within both the valve body 132 and the application structure (e.g., a manifold) within which the valve is mounted. For example, the flow passages within the application (e.g., a manifold) may be simplified in design due to the arrangement of the control port 236 in the nose 248. The first port 240 may be in fluid communication with an external device or body (e.g., a tank). The second port 244 may be in fluid communication with a fluid or pressurized source (e.g., a pump). In the illustrated example, the first port 240 and the second port 244 are arranged along the axial length of the valve body 132, with the first port 240 axially separated from the second port 244.

As noted above, the solenoid valve 100 can include a valve insert 136 is disposed within the valve bore 232. In the illustrated non-limiting example, the poppet 216 and the pin extension 220 extend through and are at least partially arranged within the valve insert 136. In the illustrated example, the second valve element 250 can be configured as a valve ball 250 that is movably retained within the valve body 132. The valve body 132 may define a ball cavity or chamber 245 that slidably receives the valve ball 250. In the illustrated non-limiting example, the ball chamber 245 at least partially encloses and supports the valve ball 250. The ball chamber 245 can be in fluid communication with the second port 244. In the illustrated non-limiting example, the valve body 132 includes a lateral wall 246 (e.g., orthogonal to the central axis 138) that spans the valve bore 232. In the illustrated non-limiting example, the lateral wall 246 is arranged axially between the second port 244 and the control port 236. The ball chamber 245 is arranged between a distal end of the valve insert 136 and the lateral wall 246. The lateral wall 246 can include a protrusion 247 that extends axially into the ball chamber 245. In the illustrated non-limiting example, the protrusion 247 is configured as a semi-spherical protrusion. In some non-limiting examples, the protrusion 247 is configured to support and raise the valve ball 250 off a bottom surface of the ball chamber 245. In this way, for example, the protrusion 247 may ensure that fluid pressure, for example, from the second port 244 may act on the valve ball 250 and force and displace the valve ball 250 toward the valve insert 136. In other non-limiting examples, the protrusion 247 can prevent the valve ball 250 from moving beyond the protrusion 247 to inhibit an over-travel condition.

In the illustrated non-limiting example, the valve insert 136 defines a poppet cavity or chamber 254 within which the poppet 216 may be movably received. The poppet chamber 254 may be in fluid communication with the first port 240. The valve insert 136 may define one or more seats or surfaces against which the poppet 216 (e.g., the first valve element) and/or the valve ball 250 (e.g., the second valve element) may engage to provide a fluid seal and prevent fluid flow along a particular flow path. For example, the valve insert 136 may define a first seat 256 and a second seat 260 that is axially separated from the first seat 256. In some non-limiting examples, the first seat 256 may be configured as a ball seat 256 against which the valve ball 250 may engage and form a seal therebetween, and the second seat 260 may be configured as a poppet seat 260 against which the poppet 216 may engage and form a seal therebetween. In the illustrated non-limiting example, the poppet seat 260 is arranged at a base of the poppet chamber 254 and the ball seat 256 is arranged at the distal end of the valve insert 136. The ball seat 256 can be arranged between the control port 236 and the second port 244 and the poppet seat 260 can be arranged between the control port 236 and the first port 240, from a fluid path perspective.

The valve insert 136 can define an annular wall 261 providing an axial channel 262 that extends between the poppet seat 260 and the ball seat 256. The pin extension 220 of the push pin 215 is received within, and extends axially through, the axial channel 262 to allow for selective engagement of the valve ball 250. In that way, selective engagement of the poppet 216 to the poppet seat 260 can provide or inhibit fluid communication between the first port 240 and the axial channel 262. Similarly, selective engagement of the valve ball 250 to the ball seat 256 can provide or inhibit fluid communication between the second port 244 and the axial channel 262.

Figure 7:
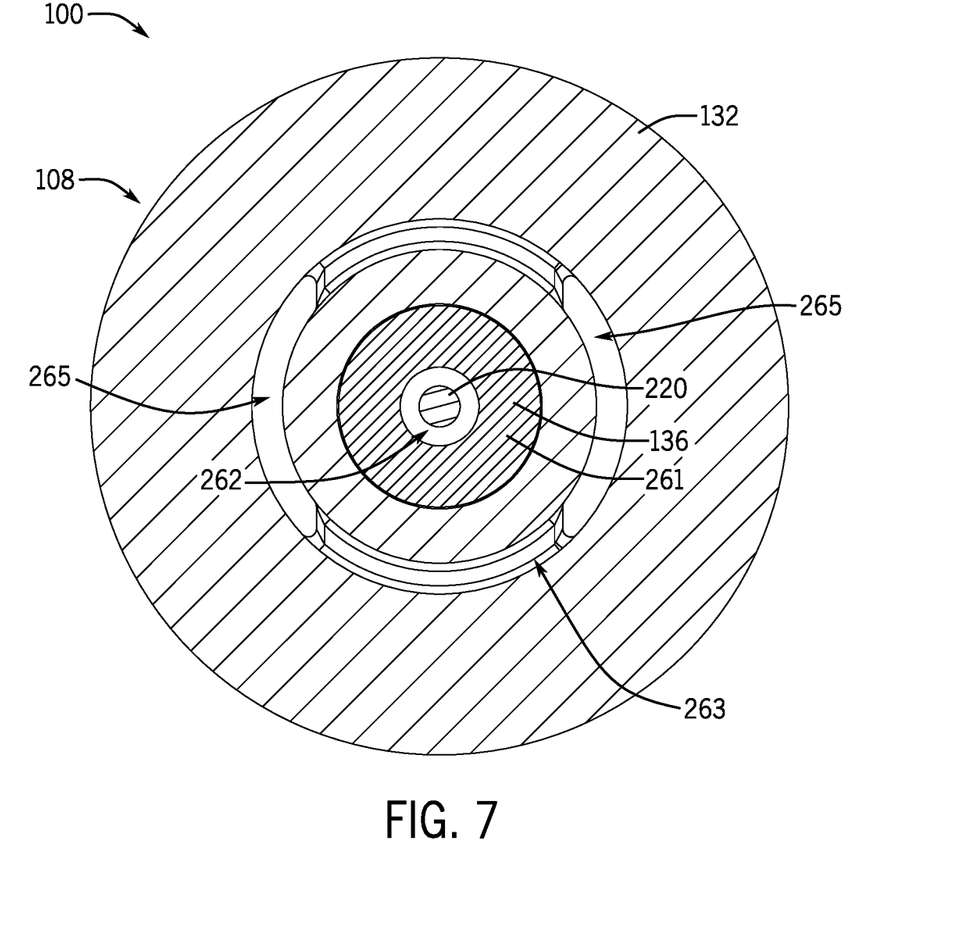
FIG. 7 is a cross-sectional view of a valve body of the solenoid valve of FIG. 3 taken along line 7-7.

In the illustrated non-limiting example, the valve body 132 can further include an annular chamber 263 arranged radially outside the axial channel 262 (e.g., radially outside the annular wall 261). The annular chamber 263 can be in fluid communication with the control port 236. In the illustrated non-limiting example, the annular chamber 263 is in fluid communication with the control port 236 via a pair of lunular channels 265 extending axially between the annular chamber 263 and the control port 236, through the lateral wall 246 (see also, FIG. 7). As best illustrated in FIG. 7, the lunular channels 265 can be arranged on circumferentially opposing sides of the valve bore 232.

With continued reference to FIGS. 3 and 4, the valve insert 136 can include a passage 267 configured as an opening extending radially through the annular wall 261 to provide fluid communication between the axial channel 262 and the annular chamber 263. In the illustrated non-limiting example, the passage 267 is arranged axially between the poppet seat 260 and the ball seat 256. As will be described below, the passage 267 connecting the axial channel 262 to the annular chamber 263 allows either the first port 240 or the second port 244 to be in fluid communication with the control port 236, depending on a configuration of the valve, which is determined by a position of the push pin 215.

In the illustrated non-limiting example, the valve insert 136 is press fit into the valve bore 232, which may simplify manufacturing compared to conventional designs. For example, one or more outer surfaces of the valve insert 136 may be in a press-fit arrangement with one or more surfaces that define the valve bore 232 and/or one or more surfaces of the valve body 132. In the illustrated non-limiting example, the valve insert 136 includes a first insert surface 249 that is press fit to a first bore surface 251 of the valve bore 232. An outer diameter of the first insert surface 249 may define a diameter that is greater than or equal to an inner diameter defined by the first bore surface 251 to provide a press fit therebetween. In some non-limiting examples, the first insert surface 249 may include one or more features to aid in forming a press fit with the first bore surface 251. For example, the first insert surface 249 may include one or more annular rings or dimples that extend radially outwardly from the first insert surface 249 and that are axially separated from one another. Further, in the illustrated non-limiting example, the valve insert 136 includes a second insert surface 253 that is press fit to a second bore surface 255. The second insert surface 253 may be axially separated from the first insert surface 249, and the second insert surface 253 may define a diameter that is less than a diameter of the first insert surface 249. For example, the second insert surface 253 may be disposed radially inward from the first insert surface 249. The second bore surface 255 may form at least a portion of the ball chamber 245. An outer diameter defined by the second insert surface 253 may be greater than or equal to an inner diameter defined by the second bore surface 255 to provide a press fit therebetween. In some non-limiting examples, the second insert surface 253 may include one or more features to aid in forming a press fit with the second bore surface 255. For example, the second insert surface 253 may include one or more annular rings or dimples that extend radially outwardly from the first insert surface 255 and that are axially separated from one another. In some non-limiting examples, the valve body 132 may be over molded onto the valve insert 136. In some non-limiting examples, the valve insert 136 may be insert molded into the valve body 132. In other non-limiting examples, the valve body 132 and the valve insert 136 can be formed as a unitary component. In some non-limiting examples, one or more seals (e.g., o-rings) may be arranged between the valve body 132 and the valve insert 136 to secure and seal the valve insert 136 within the valve body 132.

Figure 5:
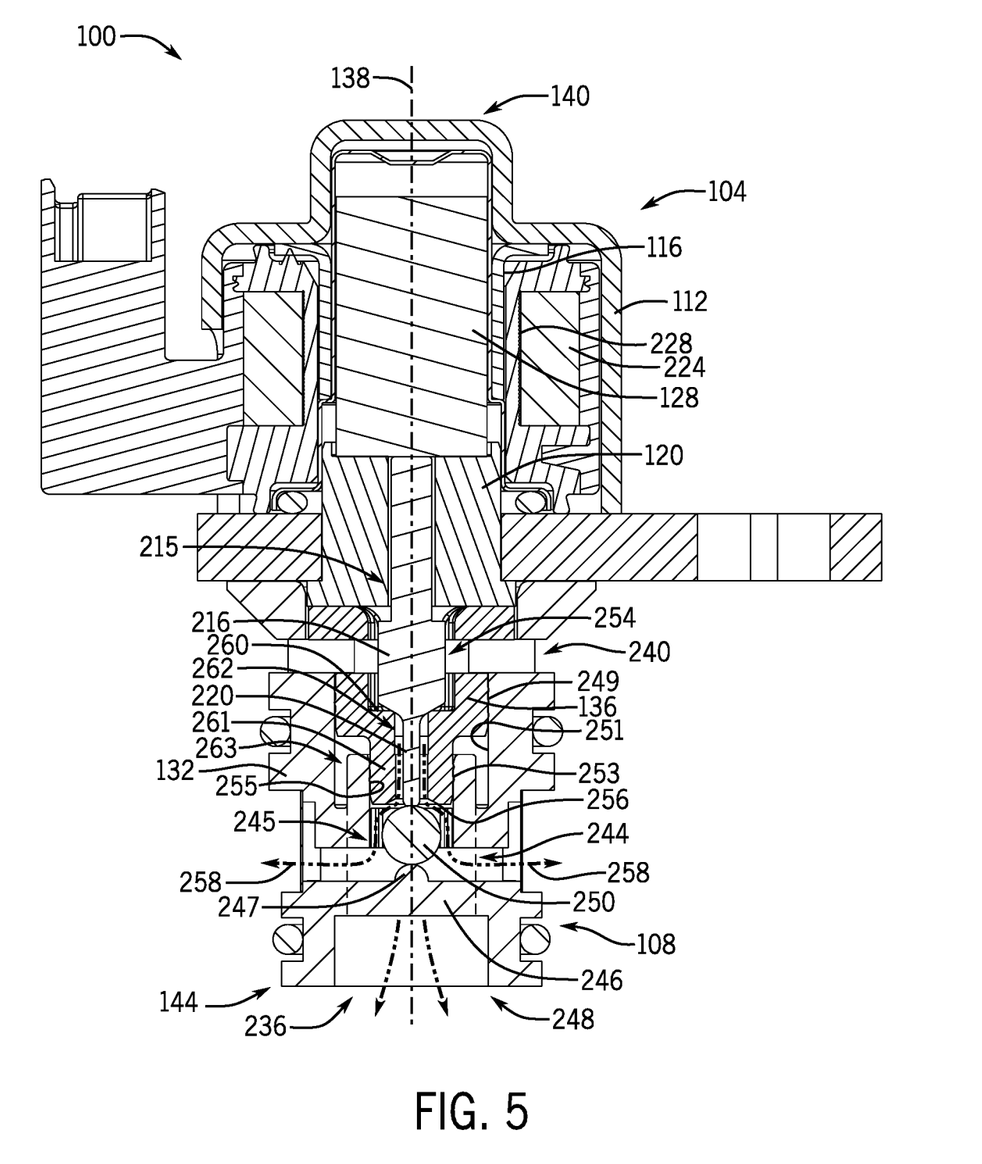
FIG. 5 is the cross-sectional view of the solenoid valve of FIG. 3 with the solenoid valve being in a second configuration.
Figure 6:
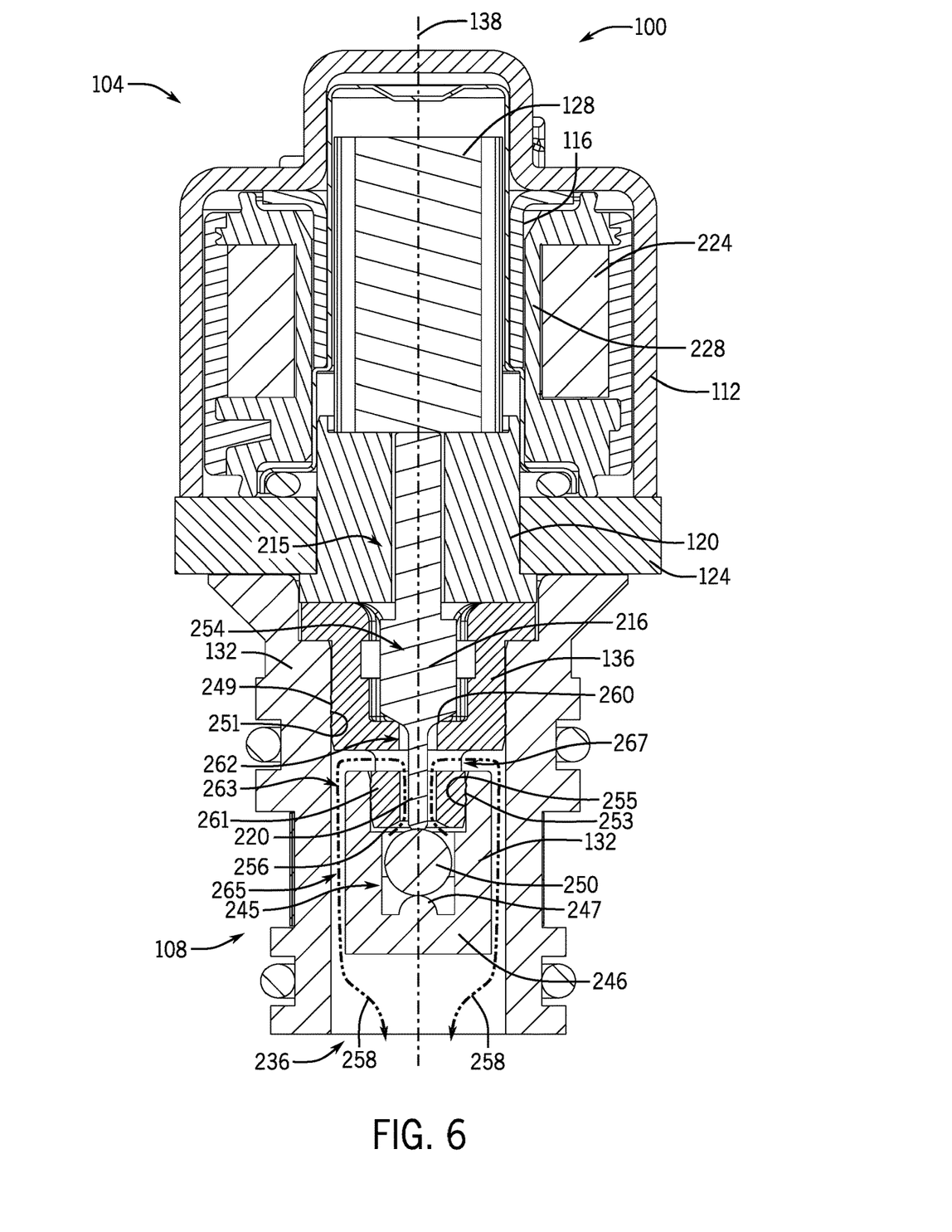
FIG. 6 is the cross-sectional view of the solenoid valve of FIG. 4 with the solenoid valve being in the second configuration.

As previously described herein, the push pin 215 may be selectively manipulated by the solenoid actuator 104 to provide one or more flow path or valve configurations. In the illustrated non-limiting example, the solenoid valve 100 is movable between a first configuration (FIGS. 3 and 4) and a second configuration (FIGS. 5 and 6). In the illustrated example, the solenoid valve 100 is transitioned between the first and second configuration by selective actuation of the push pin 215, by the solenoid actuator 104, between a first position and a second position, respectively. The first and second configurations may define different fluid flow paths through the valve portion 108 via movement of the poppet 216 and the valve ball 250 by the push pin 215. For example, the coupling between the push pin 215 and the poppet 216 allows the poppet to be selectively actuated between an open position (FIGS. 3 and 4) and a closed position (FIGS. 5 and 6). Further, the pin extension 220 extending through the axial channel 262 allows for the distal end of the push pin 215 to selectively engage the valve ball 250 to actuate the valve ball 250 between a closed position (FIGS. 3 and 4) and an open position (FIGS. 5 and 6). When the solenoid valve 100 is in a first configuration, the push pin 215 can be in the first position to move the poppet 216 into the open position to connect the control port 236 to the first port 240 and the valve ball 250 can be in the closed position to block the control port 236 from the second port 244. When the solenoid valve 100 is in a second configuration, the push pin 215 can be in the second position to move the valve ball 250 into the open position by the push pin 215 to connect the control port 236 to the second port 244 and the push pin 215 can move the poppet 216 into the closed position to block the control port 236 from the first port 240. In the illustrated non-limiting example, when the push pin 215 is in the first position, the valve ball 250 is configured to move within the ball chamber 245 to engage or disengage the ball seat 256 in response to a pressure in the second port 244. Thus, the selective actuation of the push pin 215 may selectively connect one of the first port 240 or the second port 244 to the control port 236.

FIGS. 3 and 4 illustrates the solenoid valve 100 in the first configuration and the push pin 215, and thereby the pin extension 220, in a corresponding retracted position (e.g., first position). With the wire coil 224 de-energized (i.e., no current supplied to the wire coil 224), the push pin 215 may be maintained or held in the first position by fluid pressure (e.g., in an upward direction from the perspective of FIG. 3) acting on the valve ball 250 from the second port 244. With the push pin 215 in the first position, the armature 128 is displaced from the armature surface 196. With the push pin 215 in the first position, the pin extension 220 may be retracted within the axial channel 262 to provide sufficient axial clearance to allow the valve ball 250 to move relative to the ball seat 256. Accordingly, pressure created by the fluid source connected to the second port 244 may press or force the valve ball 250 against the ball seat 256. The valve ball 250 being in engagement with the ball seat 256 prevents or inhibits fluid flow between the second port 244 and the control port 236.

Further, with the push pin 215 in the first position, the poppet 216 may be lifted relative to the poppet seat 260, which defines an axial space or gap between the poppet 216 and the poppet seat 260. The axial gap between the poppet 216 and the poppet seat 260 enables fluid flow between the control port 236 and the first port 240 along a first flow path 252. The first flow path 252 includes the control port 236, the annular chamber 263, the axial channel 262, the poppet chamber 254, and the first port 240.

Turning to FIGS. 5 and 6, when it is desired to transition the solenoid valve 100 from the first configuration to the second configuration, current may be applied to the wire coil 224 with a first polarity to actuate the push pin 215 from the first, retracted position to the second, extended position. The current with the first polarity applied to the wire coil 224 may provide an electromagnetic force on the armature 128 to move the armature 128 from a first position to a second position. By energizing the solenoid actuator 104, the push pin 215 moves to the second position (e.g., axially toward the nose 248 of the valve body 132). The push pin 215 may be allowed to move toward the second position until the poppet 216 engages the poppet seat 260 to provide a seal therebetween. The engagement and seal between the poppet 216 and the poppet seat 260 prevents or inhibits fluid flow between the first port 240 and the control port 236 (e.g., the first flow path 252 is blocked). With the push pin 215 extended, the pin extension 220 moves axially towards the valve ball 250 to lift the valve ball 250 away from and off of the ball seat 256. The pin extension 220 lifting the valve ball 250 off the ball seat 256 opens a second flow path 258 between the control port 236 and the second port 244. The second flow path 258 includes the second port 244, the ball chamber 245, the axial channel 262, the annular chamber 263, and the control port 236.

To return the solenoid valve 100 to the first configuration, the wire coil 224 may be de-energized, discontinuing the current applied thereto, and the armature 128 may move to the first position by fluid pressure acting on the valve ball 250, which then forces the armature 128, and the push pin 215 coupled, attached, or engaged therewith, to the first position. With the push pin 215 back in the first position, fluid communication between the first port 240 and the control port 236 is provided along the first flow path 252 and fluid communication between the second port 244 and the control port 236 is inhibited or blocked (e.g., the second flow path 258 is blocked). The selective activation of the solenoid actuator 104, and the associated selective retraction and extension of the push pin 215 between the first and second positions can be used to control a pressure provided to the control port 236. For example, if the pressure in the control port 236 is required or desired to increase, the solenoid actuator 104 can selectively actuate the push pin 215 to the second position (or maintain the push pin 215 in the second position if it is already in the second position), which actuates the push pin 215 to the extended position. In the extended position, fluid communication is provided between the second port 244 and the control port 236, and fluid communication between the first port 240 and the control port 236 is blocked. With the second port 244 being connected to a fluid source, the fluid communication between the control port 236 and the second port 244 may supply the increased pressure of the fluid source to the control port 236, which raises a pressure at the control port 236.

Alternatively, if the pressure in the control port 236 is required or desired to decrease, the solenoid actuator 104 can selectively actuate the push pin 215 to the first position (or maintain the push pin 215 in the first position if it is already in the first position), which actuates the push pin 215 to the retracted position. In the retracted position, fluid communication is blocked between the second port 244 and the control port 236, and fluid communication between the first port 240 and the control port 236 is provided. With the first port 240 being connected to a tank or reservoir (e.g., atmospheric pressure or slightly above atmospheric pressure), the fluid communication between the control port 236 and the first port 240 may decrease a pressure at the control port 236.

In the non-limiting example of FIGS. 1-7, the solenoid control valve 100 is designed with the armature 128 and the push pin 215 in a normally retracted configuration. That is, when the wire coil 224 is de-energized, the armature 128 may be held in the first position where the armature 128 and the push pin 215 are retracted (e.g., poppet 216 is axially spaced from the poppet seat 260). In some non-limiting examples, the solenoid control valve 100 may be designed in a normally extended configuration where the armature 128 and the push pin 215 are extended (e.g., the poppet 216 engages the poppet seat 260 and the valve ball 250 is displaced off the ball seat 256 by the pin extension 220 of the push pin 215), and the energization of the wire coil 224 results in retraction of the armature 128 and the push pin 215 coupled thereto. That is, rather than energization of the wire coil 224 resulting in the armature 128 extending the poppet 216 toward the poppet seat 260, the solenoid control valve 100 may be designed so that energization of the wire coil 224 results in the armature 128 retracting the poppet 216 away from the poppet seat 260. In other words, the solenoid control valve 100 may be designed with a reverse logic when compared to the logic and flow control operation provided by the configuration of FIGS. 1-7. In such a reverse logic configuration, a solenoid actuator may include a spring arranged between an armature and armature tube to bias the armature, and thereby the pin, into an extended position.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A solenoid valve, comprising:
    a valve body including a valve bore, a control port, a first port, and a second port, wherein the control port is arranged in a nose of the valve body;
    a solenoid actuator coupled to the valve body and configured to selectively move a pin between a first position and a second position, wherein the pin extends from the solenoid actuator into the valve bore;
    a valve insert arranged within the valve bore, the valve insert defining a cavity in fluid communication with the first port and including a first valve seat arranged at a base of the cavity and a second valve seat;
    a first valve element coupled to the pin, the first valve element being received in the cavity and movable with the pin to selectively engage the first valve seat; and
    a second valve element movable by the pin to selectively engage the second valve seat;
    wherein movement of the pin, by the solenoid actuator, between the first position and the second position selectively connects the control port to the first port or the second port.

2. The solenoid valve of claim 1, wherein the first valve seat is axially separated from the second valve seat.

3. The solenoid valve of claim 1, wherein at least one of:
    the first valve element is configured as a poppet; and
    the second valve element is configured as a valve ball.

4. The solenoid valve of claim 1, wherein when the pin is in the first position, the second valve element engages the second valve seat to block fluid communication between the second port and the control port, and the first valve element is lifted from the first valve seat to provide fluid communication between the first port and the control port.

5. The solenoid valve of claim 1, wherein when the pin is in the second position, a distal end of the pin lifts the second valve element off the second valve seat to provide fluid communication between the second port and the control port, and the first valve element is engaged with the first valve seat to block fluid communication between the first port and the control port.

6. The solenoid valve of claim 1, wherein the pin defines a longitudinal axis, and wherein the control port is aligned with the longitudinal axis at the nose of the valve body.

7. The solenoid valve of claim 1, wherein the valve insert includes an axial channel extending from the first valve seat to the second valve seat; and
    wherein a pin extension extends from the first valve element and is received within the axial channel to selectively engage the second valve element.

8. The solenoid valve of claim 7, wherein the valve body further includes an annular chamber in fluid communication with the control port and arranged radially outside the axial channel of the valve insert; and
    wherein the valve insert further includes a passage to provide fluid communication between the axial channel and the annular chamber, the passage being arranged axially between the first valve seat and the second valve seat.

9. A solenoid valve movable between a first configuration and a second configuration, the solenoid valve comprising:
    a valve body including a valve bore, a control port, a first port, and a second port, wherein the control port is arranged in a nose of the valve body;
    a solenoid actuator coupled to the valve body and configured to selectively actuate a pin extending from the solenoid actuator and into the valve bore;
    a valve insert arranged within the valve bore, the valve insert defining a cavity in fluid communication with the first port and including a poppet seat arranged at a base of the cavity and between the control port and the first port and a ball seat arranged between the control port and the second port;
    a poppet coupled to the pin, the poppet being received in the cavity and movable, by the solenoid actuator, between an open position and a closed position; and
    a valve ball slidably received within a ball chamber included in the valve body;
    wherein when the solenoid valve is in the first configuration, the poppet is in the open position to provide fluid communication between the first port and the control port, and the valve ball is configured to engage the ball seat in response to a pressure in the second port; and
    wherein when the solenoid valve is in the second configuration, the poppet is in the closed position and in engagement with the poppet seat, and a distal end of the pin engages the valve ball to provide fluid communication between the second port and the control port.

10. The solenoid valve of claim 9, wherein the poppet seat is axially separated from the ball seat.

11. The solenoid valve of claim 9, wherein when the solenoid valve is in the first configuration, the valve ball blocks fluid communication between the second port and the control port.

12. The solenoid valve of claim 9, wherein when the solenoid valve is in the second configuration, the poppet blocks fluid communication between the first port and the control port.

13. The solenoid valve of claim 9, wherein the valve body further includes a lateral wall arranged axially between the second port and the control port; and
    wherein the ball chamber is arranged between the ball seat and the lateral wall.

14. The solenoid valve of claim 9, wherein the valve insert defines an annular wall providing an axial channel extending from the poppet seat to the ball seat; and
    wherein the pin includes a pin extension that extends from the poppet to the distal end of the pin, and the pin extension is received within the axial channel to selectively engage the valve ball.

15. The solenoid valve of claim 14, wherein the valve body further includes an annular chamber in fluid communication with the control port and arranged radially outside the annular wall of the valve insert.

16. The solenoid valve of claim 15, wherein the valve insert further includes an opening extending radially through the annular wall to provide fluid communication between the axial channel and the annular chamber.

17. The solenoid valve of claim 16, wherein the poppet is movable within a poppet chamber defined by the valve insert.

18. The solenoid valve of claim 17, wherein when the solenoid valve is in the first configuration, fluid communication is provided between the control port and the first port by a first flow path including the control port, the annular chamber, the axial channel, the poppet chamber, and the first port; and
    wherein when the solenoid valve is in the second configuration, fluid communication is provided between the second port and the control port by a second flow path including the second port, the ball chamber, the axial channel, the annular chamber, and the control port.

19. A solenoid valve, comprising:
    a valve body including a valve bore, a control port, a first port, and a second port, wherein the control port is arranged in a nose at a distal end of the valve body;
    a solenoid actuator coupled to the valve body and configured to selectively move a pin between a first position and a second position, wherein the pin extends from the solenoid actuator into the valve bore;
    a valve insert arranged within the valve bore, the valve insert defining a cavity in fluid communication with the first port and the valve insert including a first valve seat arranged at a base of the cavity, a second valve seat, and an annular wall that defines an axial channel extending between the first valve seat and the second valve seat;
    a first valve element coupled to the pin, the first valve element being moveably received in the cavity and movable with the pin to selectively open and close the first valve element relative to the first valve seat to, respectively, provide or inhibit fluid communication between the first port and the axial channel; and
    a second valve element selectively engageable by the pin to selectively open and close the second valve element relative to the second valve seat to, respectively, provide or inhibit fluid communication between the second port and the axial channel;
    wherein the valve body further includes an annular chamber in fluid communication with the axial channel and the control port such that movement of the pin, by the solenoid actuator, between the first position and the second position selectively provides fluid communication between the control port and the first port or the control port and the second port, respectively.

* * * * *